US006722115B2

(12) United States Patent
DeWinter

(10) Patent No.: US 6,722,115 B2
(45) Date of Patent: Apr. 20, 2004

(54) RAKE WITH EXTENDABLE MATERIAL-MOVING IMPLEMENT

(76) Inventor: David S. DeWinter, 3240 N. Hawkins Rd., Luther, MI (US) 49656-9371

( * ) Notice: Subject to any disclaimer, the term of this patent is extended or adjusted under 35 U.S.C. 154(b) by 0 days.

(21) Appl. No.: 09/813,552

(22) Filed: Mar. 21, 2001

(65) Prior Publication Data

US 2002/0134066 A1 Sep. 26, 2002

(51) Int. Cl.$^7$ ................................................. A01D 7/10
(52) U.S. Cl. ........................ 56/400.12; 56/400.04; 172/375
(58) Field of Search ................ 172/34, 371, 372, 172/373, 374, 375, 378, 380, 381; 56/400.01, 400.04, 400.05, 400.06, 400.07, 400.11, 400.12, 400.16, 400.19, 400.21; 274/508, 50.9

(56) References Cited

U.S. PATENT DOCUMENTS

| 795,383 A | 7/1905 | Arason |
| 870,227 A | 11/1907 | Cronk |
| 922,515 A | 5/1909 | Riley |
| 1,099,954 A | 6/1914 | Webster |
| 1,128,239 A | 2/1915 | Stitson |
| 1,182,153 A | 5/1916 | Ellwein |
| 1,182,789 A | 5/1916 | Perry |
| 1,217,322 A | 2/1917 | Lutze |
| 1,264,750 A | 4/1918 | Bacho |
| 1,362,065 A | 12/1920 | Walker |
| 1,469,957 A | 10/1923 | Rich |
| 1,936,800 A | 11/1933 | Moork |
| 2,481,442 A | 9/1949 | Paul |
| 2,642,712 A | 6/1953 | Huff |
| 2,713,763 A | 7/1955 | Holman et al. |
| 2,797,544 A | * 7/1957 | Fite ........................... 56/400.1 |
| 2,855,746 A | 10/1958 | Miller, Sr. |
| 2,891,374 A | * 6/1959 | Richmond ............... 56/400.12 |
| 3,012,392 A | 12/1961 | Walters et al. |
| 3,688,483 A | 9/1972 | Hamilton |
| D230,247 S | * 2/1974 | Parry .............................. D8/6 |
| 3,884,023 A | 5/1975 | Robinson |
| 3,921,725 A | * 11/1975 | Trutor et al. ................. 172/374 |
| 4,378,671 A | * 4/1983 | Gascon ...................... 294/50.9 |
| 4,776,158 A | 10/1988 | Baum |
| 5,003,760 A | 4/1991 | Webb |
| 5,025,621 A | * 6/1991 | DeMarco ................. 56/400.05 |
| 5,058,370 A | * 10/1991 | Russell .................... 56/400.12 |
| 5,305,591 A | 4/1994 | Gibson, Jr. |
| 5,343,684 A | 9/1994 | Siler, III |
| 5,425,226 A | 6/1995 | Kaufman |

(List continued on next page.)

FOREIGN PATENT DOCUMENTS

| DE | 19854048 A1 | 5/1999 |
| GB | 2093672 A | 9/1982 |
| GB | 2240700 A | 8/1991 |

*Primary Examiner*—Robert E. Pezzuto
*Assistant Examiner*—Nathan Mammen
(74) *Attorney, Agent, or Firm*—Price, Heneveld, Cooper, DeWitt & Litton

(57) ABSTRACT

A combination rake and material-spreading tool includes an elongate handle, a raking implement attached to an end of the handle, and a material-spreading implement. The material-spreading implement includes a substantially continuous plate that is moveable between a retracted position in which the material-spreading implement exposes the rake tines for normal raking operations and a fully deployed position in which the material-spreading implement is positioned with a lower edge of the substantially continuous plate positioned proximate distal free ends of the tines. An actuator is mounted on the handle, and a mechanical linkage operably connects the actuator with the material-spreading implement, whereby positioning of the material-spreading implement is achieved by manipulation of the actuator.

9 Claims, 7 Drawing Sheets

U.S. PATENT DOCUMENTS

| | | | |
|---|---|---|---|
| 5,461,849 A | | 10/1995 | Allen |
| 5,501,069 A | | 3/1996 | Lentz |
| 5,564,267 A | * | 10/1996 | Bricker et al. ............ 56/400.12 |
| 5,609,215 A | | 3/1997 | Rios et al. |
| 5,626,009 A | | 5/1997 | Bower et al. |
| 5,713,193 A | | 2/1998 | Stapley et al. |
| 5,788,299 A | * | 8/1998 | Wilkinson ................... 294/51 |
| 5,881,545 A | * | 3/1999 | Wilson ........................ 29/843 |
| 5,887,364 A | * | 3/1999 | Toth ............................ 37/266 |
| 5,901,540 A | * | 5/1999 | Vella .......................... 294/50.6 |
| 5,970,696 A | | 10/1999 | Van Benschoten, Jr. |
| 6,250,697 B1 | * | 6/2001 | Clugston ................... 294/50.9 |
| 6,272,827 B1 | * | 8/2001 | Hsu ......................... 56/400.12 |
| 6,336,314 B1 | * | 1/2002 | Crevier ..................... 294/50.8 |
| 6,367,236 B1 | * | 4/2002 | Marcone .................. 56/400.12 |
| 6,526,737 B2 | * | 3/2003 | Martin ..................... 56/400.07 |

* cited by examiner

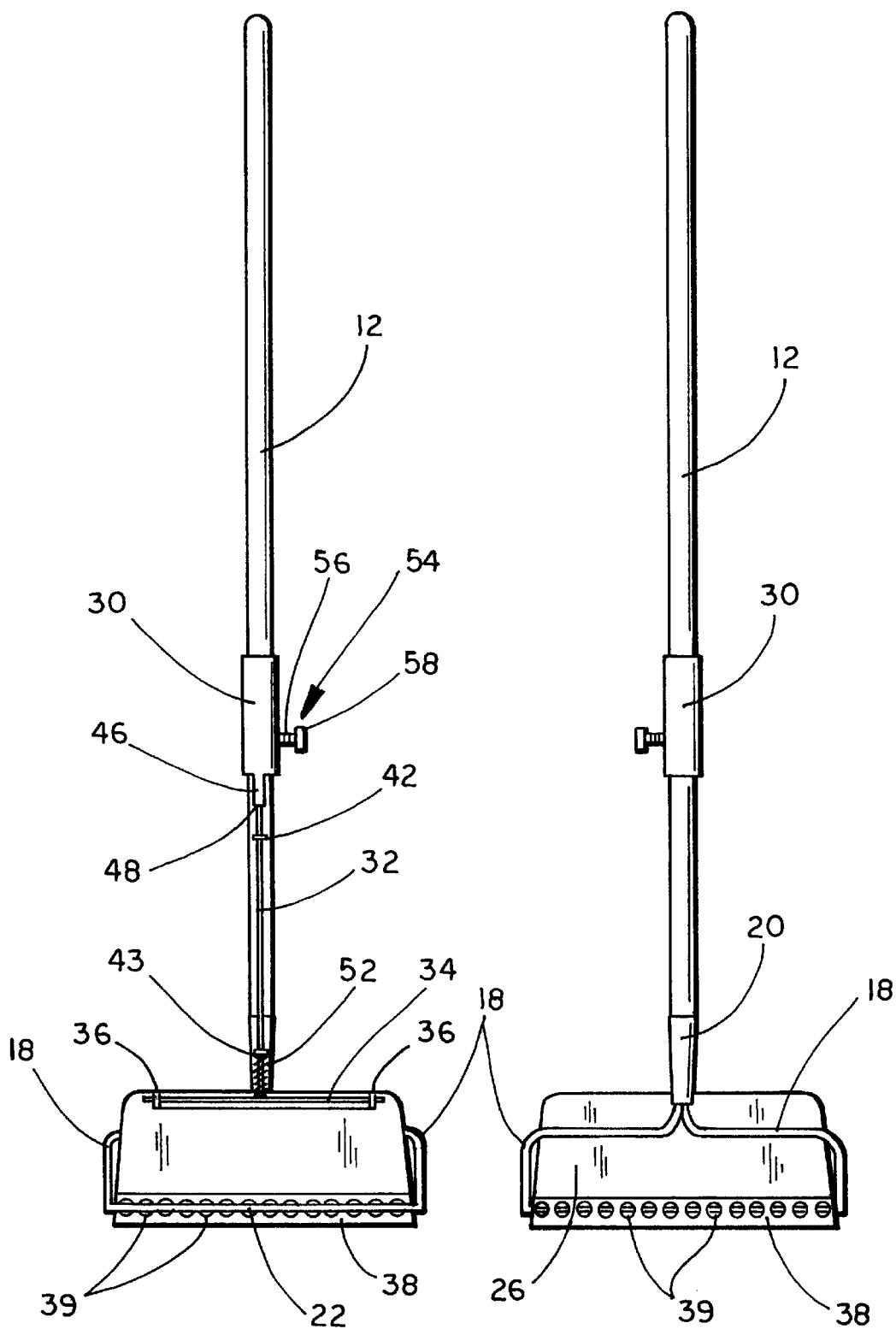

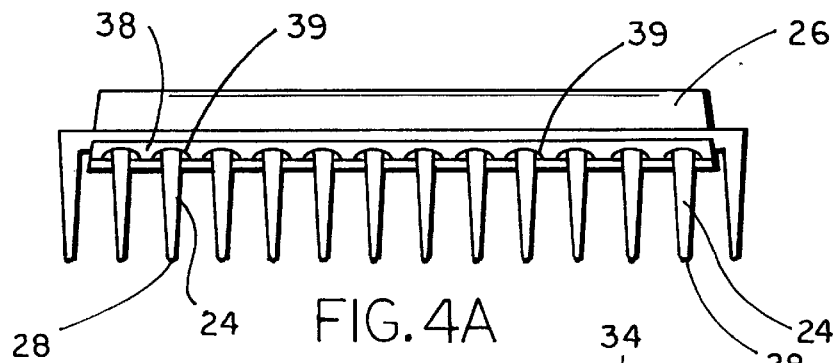
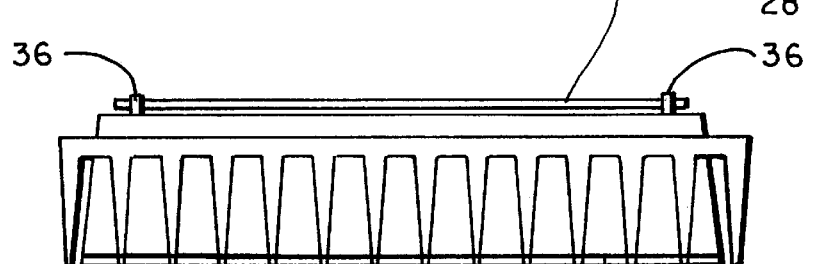
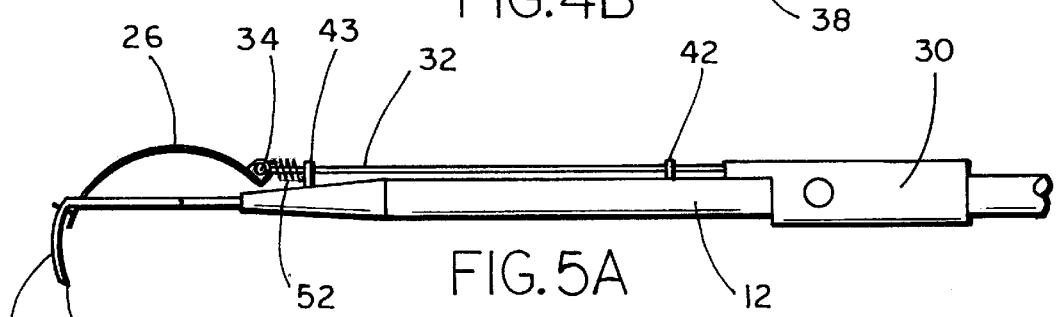
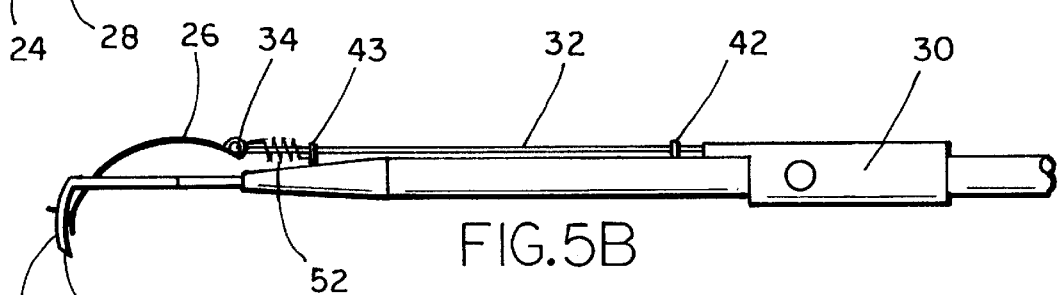
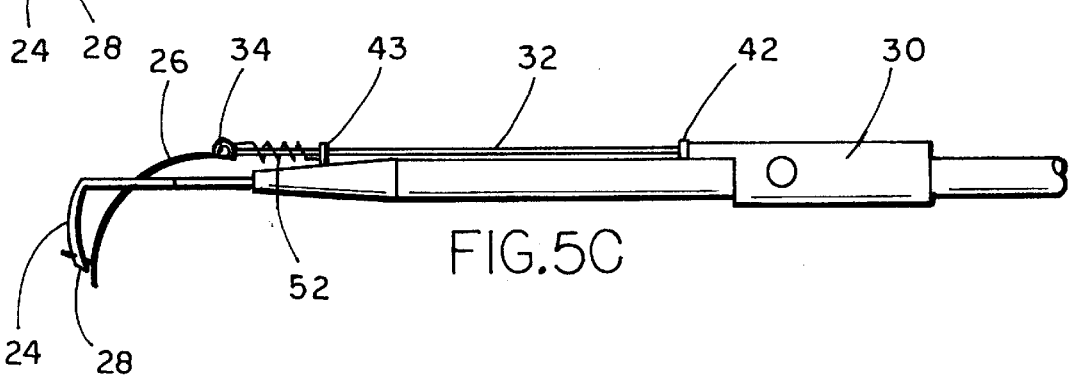

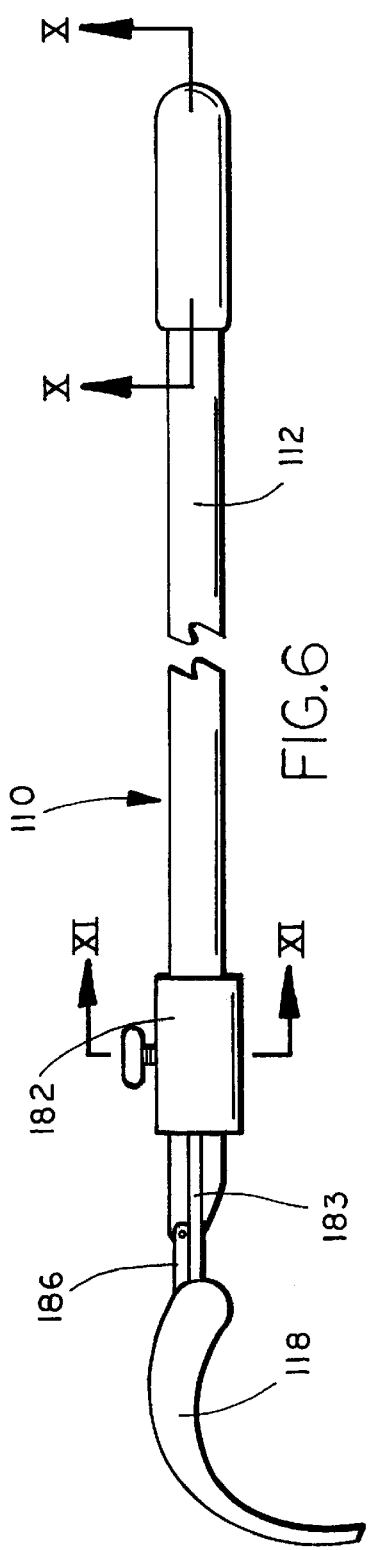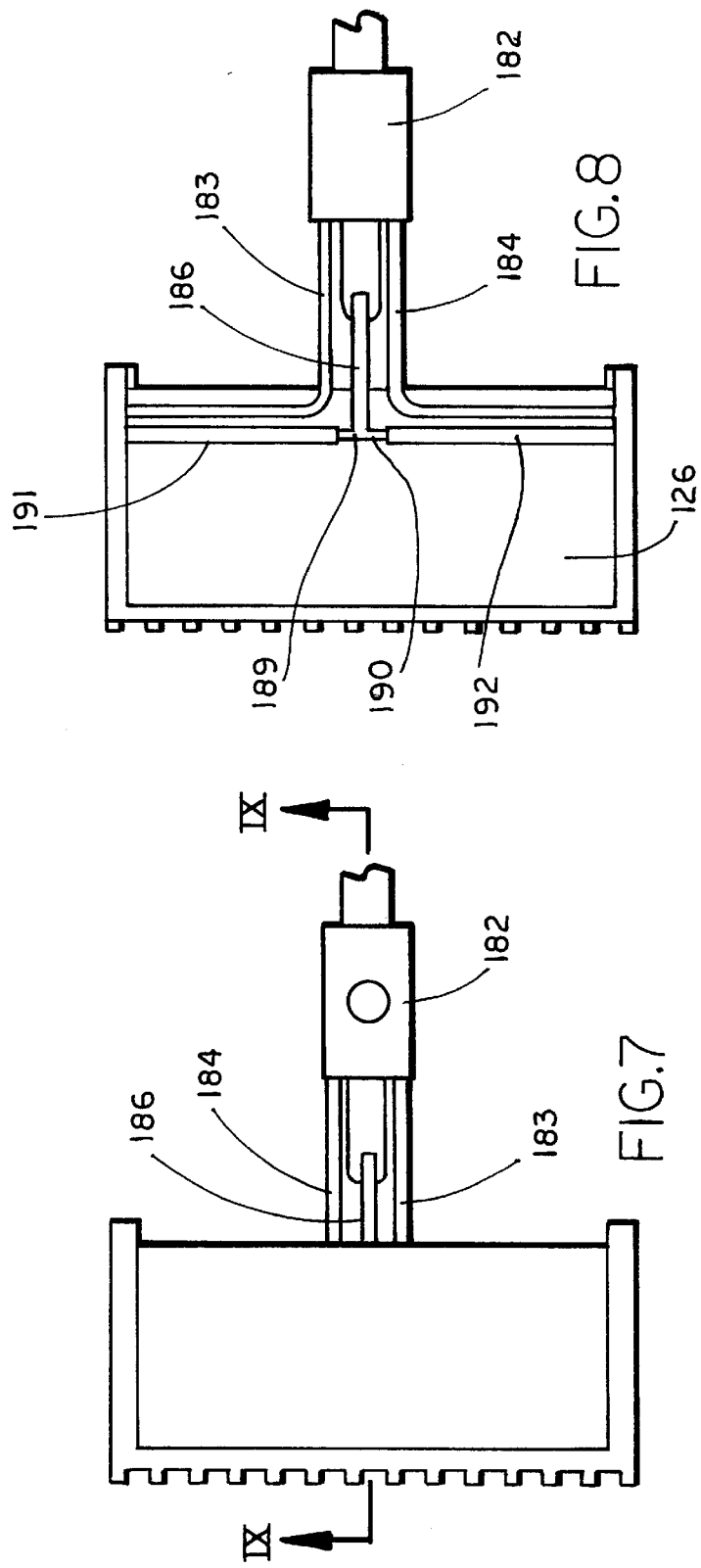

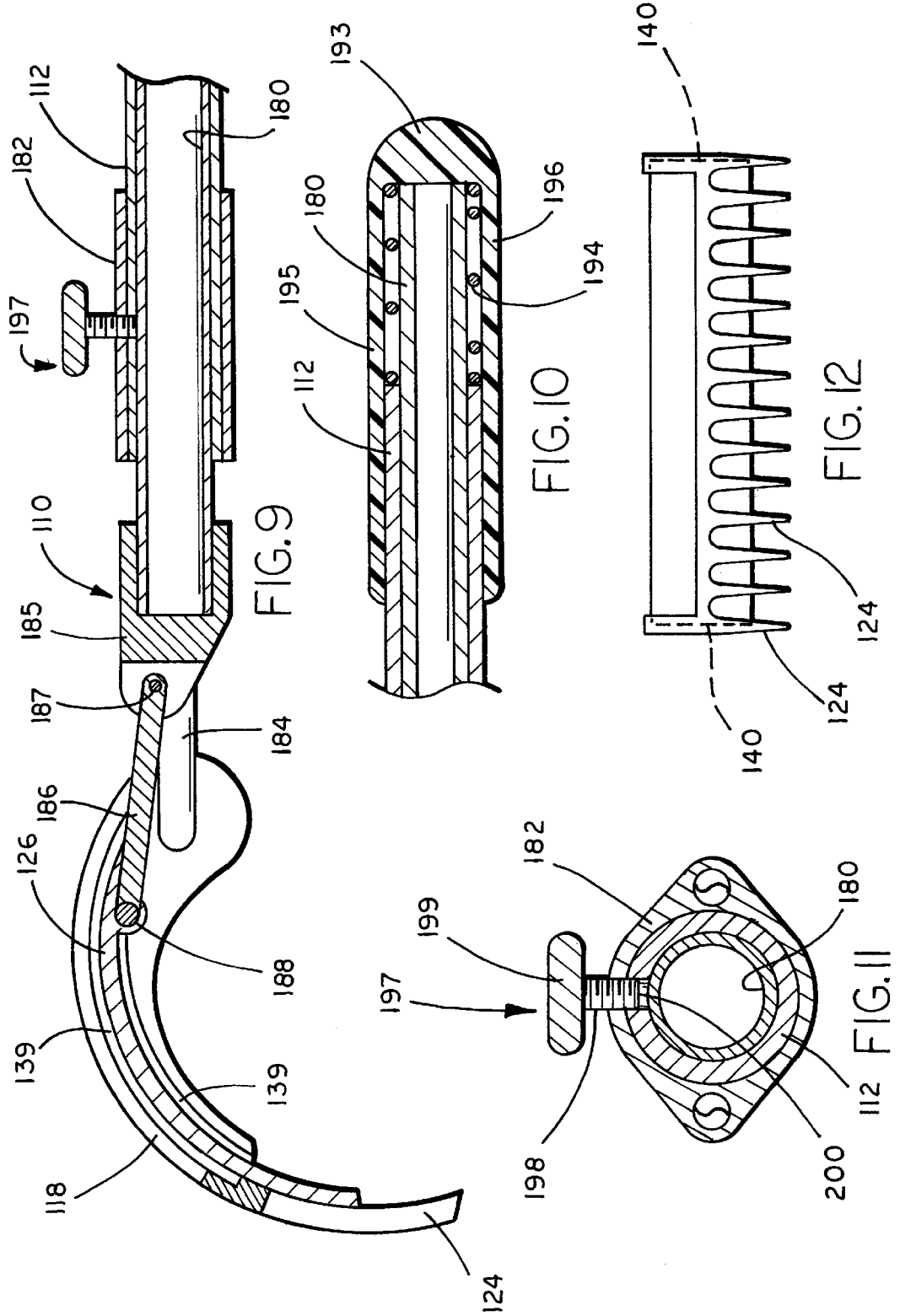

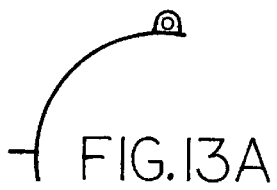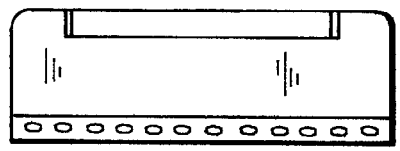
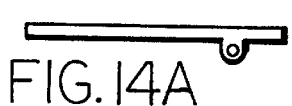
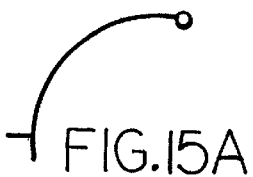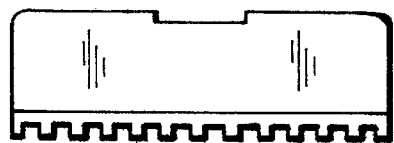
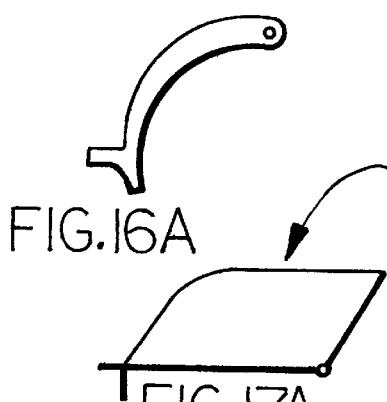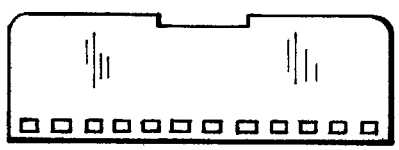
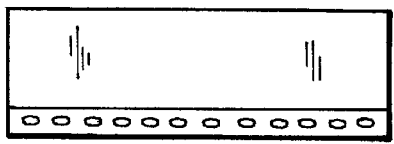
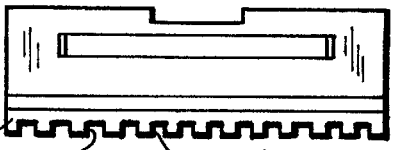
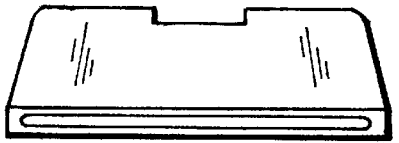

RAKE WITH EXTENDABLE MATERIAL-MOVING IMPLEMENT

FIELD OF THE INVENTION

This invention relates to a combination rake and material-spreading tool, and more particularly to a tool having a raking implement that can be used for collecting leaves and the like, and a material-spreading implement that may be used for spreading gravel, sand, etc.

BACKGROUND OF THE INVENTION

Various types of gardening, cultivating, and landscaping tools have been developed for various applications, including soil tilling, collecting leaves, weeds, pine needles, small rocks and debris, and for cutting unwanted roots, weeds and plants. Such tools include various rakes, hoes, etc. Because gardeners, cultivators and landscapers often require several different types of tools contemporaneously, many combination tools have been developed that allow a worker to quickly switch back and forth between different types of gardening, cultivating and/or landscaping implements. In addition to reducing the number of tools that must be handled and/or transported, it is also possible to reduce the number of tools that must be stored. Such combination tools include various rakes having an attached hoe or cutting implement which may be used by rotating the handle with respect to its longitudinal axis 180° C.

In addition to the need for raking tools and cutting tools (such as hoes), there is also a need for tools that are useful for spreading various materials, such as sand, wood chips, bark, ornamental stone, top soil, peat moss and the like. Typically, rakes and/or shovels are used for spreading such materials. The known combination tools do not address the need for a tool that can be easily converted for use as a rake and/or as a material-moving tool.

SUMMARY OF THE INVENTION

In one aspect, the invention provides a combination rake and material-spreading tool that can be easily converted from a raking tool to a material-spreading tool. The tool includes an elongate handle, a raking implement attached to an end of the handle, wherein the raking implement includes a plurality of tines, and a material-spreading implement. The material-spreading implement includes a substantially continuous plate that is moveable between a retracted position in which the material-spreading implement exposes the rake tines for normal raking operations and a fully deployed position in which the material-spreading implement is positioned with a lower edge of the substantially continuous plate positioned proximate distal free ends of the tines.

In another aspect, the invention encompasses a kit for converting a rake into a combination rake and material-spreading tool. The kit includes a material-spreading implement configured for attachment to a rake and including a substantially continuous plate that is moveable between a retracted position in which the material-spreading implement exposes the rake tines for normal raking operations, and a fully deployed position in which the material-spreading implement is positioned with a lower edge of the substantially continuous plate positioned proximate distal free ends of the tines.

These and other features, advantages and objects of the present invention will be further understood and appreciated by those skilled in the art by reference to the following specification, claims and appended drawings.

BRIEF DESCRIPTION OF THE DRAWINGS

FIG. 2 is a top view of the combination rake and material-spreading tool shown in FIG.

FIG. 3 is a bottom view of the tool shown in FIG. 1.

FIG. 4A is a front view of the tool shown in FIG. 1 with the material-spreading implement in the retracted position.

FIG. 4B is a front view of the tool shown in FIG. 1 with the material-spreading implement in the fully deployed position.

FIG. 5A is a side view of the tool shown in FIG. 1 with the material-spreading implement in a retracted position.

FIG. 5B is a side view of the tool shown in FIG. 1 with the material-spreading implement in a partially deployed position.

FIG. 5C is a side view of the tool shown in FIG. 1 with the material-spreading implement in a fully deployed position.

FIG. 6 is a side view of a combination rake and material-spreading tool in accordance with a second embodiment of the invention.

FIG. 7 is a top view of the tool shown in FIG. 6, with a portion of the handle broken away.

FIG. 8 is a bottom view of the tool shown in FIG. 6, with a portion of the handle broken away.

FIG. 9 is a cross-sectional view of the tool shown in FIGS. 6–8, as seen along view lines IX—IX of FIG. 7.

FIG. 10 is a cross-sectional view of the proximal end of the tool shown in FIGS. 6–9, as seen along view lines X—X of FIG. 6.

FIG. 11 is a transverse cross-sectional view of the tool shown in FIGS. 6–10 as seen along view lines XI—XI of FIG. 6.

FIG. 12 is a front view of the tool shown in FIGS. 6–11.

FIGS. 13A, 14A, 15A, 16A, 17A, 18A and 19A are side views of various alternative material-spreading implements that may be used with the invention.

FIGS. 13B, 14B, 15B, 16B, 17B, 18B and 19B are top views of the material-spreading implements shown in FIGS. 13A, 14A, 15A, 16A, 17A, 18A and 19A, respectively.

DETAILED DESCRIPTION OF PREFERRED EMBODIMENTS

Figure 1:
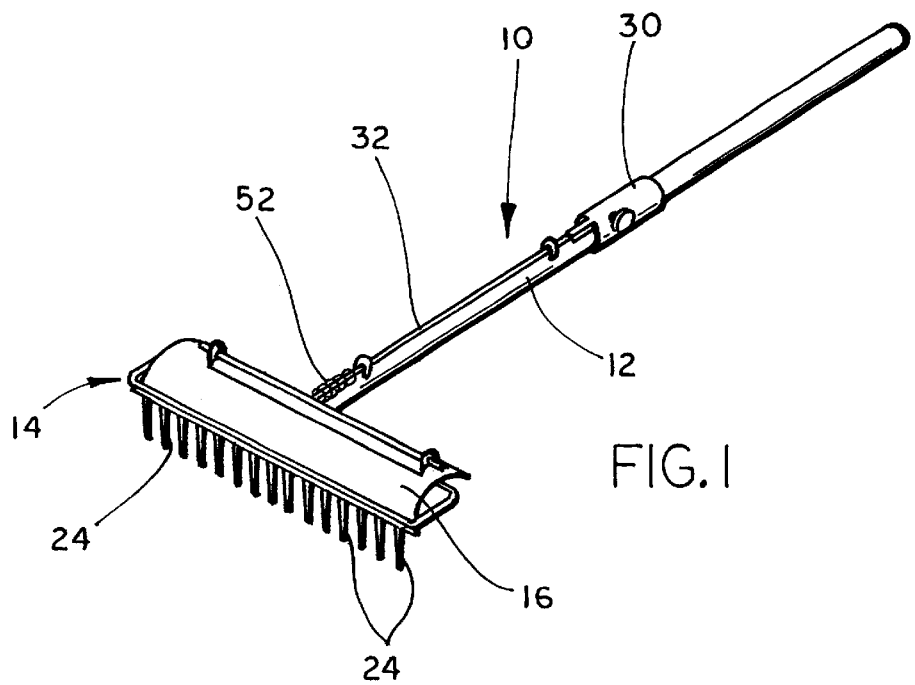
FIG. 1 is a perspective view of a combination rake and material-spreading tool in accordance with a first embodiment of the invention.

An embodiment of a combination rake and material-spreading tool 10 is shown in FIGS. 1–5C. Tool 10 includes an elongate handle 12, a raking implement 14, and a material-spreading implement 16. In the illustrated embodiment, raking implement 14 includes arms 18 (FIGS.

2 and 3) that are attached to a distal end 20 of handle 12, and project laterally outwardly and away from end 20. Arms 18 support a bar 22 that extends in a direction transverse to handle 12. Bar 22 supports a plurality of rake tines 24. In the illustrated embodiment, tines 24 are rigid tines that do not exhibit an appreciable or significant amount of flexure during normal use, i.e. tines 24 are of the type used on tools sometimes referred to as stone or bow rakes. Tines 24 are of relatively short length, generally parallel, and generally evenly spaced apart.

Material-spreading implement 16 includes a substantially continuous plate 26 (FIG. 3) that is moveable between a retracted position, as shown in FIGS. 4A and 5A, and a fully deployed position, as shown in FIGS. 4B and 5C. In the retracted position, the material-spreading implement 16 exposes rake tines 24 for normal raking operations, i.e. substantially the entire length of tines 24 may be exposed so that tool 10 may be used as a normal stone or bow rake. In the fully deployed position, material-spreading implement 16 is positioned with a lower edge of the substantially continuous plate 26 positioned proximate distal free ends 28 of tines 24. In the illustrated embodiment, plate 26 is substantially continuous, i.e. uninterrupted by apertures, slots, or other discontinuities, and has sufficient length and width to completely cover or superpose tines 24 when material-spreading implement 16 is in the fully deployed position. Material-spreading implement 16 may also be positioned at a location intermediate between the fully retracted position and the fully deployed position, such as a partially deployed position as shown in FIG. 5B.

To effect remote operation of moveable material-spreading implement 16 between the retracted and fully deployed positions, an actuator 30 is provided on handle 12. A mechanical linkage such as a push rod 32 operably links actuator 30 to material-spreading implement 16, whereby movement of material-spreading implement 16 between the retracted position and the fully deployed position can be achieved by manipulation of actuator 30. In the illustrated embodiment, actuator 30 is a generally cylindrically shaped member having a cylindrical bore through which handle 12 extends, such that actuator 30 is slidably moveable along handle 12. However, various alternative actuator mechanisms may be employed, including rotating actuators, levers and the like. Illustrated actuator 30 may be regarded as an extension of push rod 32 having a surface adapted as a hand grip that can be easily and comfortably manipulated to effect movement of push rod 32 and hence material-spreading implement 16. In the illustrated embodiment, plate 26 is pivotably mounted on axle 34. Axle 34 is connected to a distal end of push rod 32 and extends transversely with respect to the longitudinal axis of push rod 32. Plate 26 is provided with a pair of brackets 36 (FIGS. 2 and 4B) that facilitate pivotable mounting of plate 26 on axle 34.

In the embodiment illustrated in FIGS. 1–5C, a guide plate 38 is integrally attached to plate 26. Guide plate 38 defines a plurality of apertures 39 through which tines 24 project to guide material-spreading implement 16 during movement between the retracted position and the fully deployed position.

An advantage with the embodiment of FIGS. 1–5C is that guide plate 38 may perform the additional function of a tine cleaner. In other words, should materials become entangled or caught between tines 24, actuator 30 may be pushed downwardly along handle 12 to cause guide plate 38 to scrape material from tines 24.

Guides 42, 43 are attached to handle 12 to limit movement of push rod 32 to linear movement in a direction substantially parallel with the longitudinal axis of handle 12. In the illustrated embodiment, actuator 30 includes a limiter 46 (FIG. 1) that projects downwardly from actuator 30, and has a bottom seating surface 48 that engages guide 42 when material-spreading implement 16 is moved to the fully deployed position. Thus, guide 42 also serves as a stop to prevent over-extension of material-spreading implement 16. Various alternative stopping means may be employed.

As shown in FIGS. 5A–5C, material-spreading implement 16 is biased or urged into the retracted position, such as with a spring 52. A lock 54 (FIG. 2) is provided for retaining the material-spreading implement 16 in a selected position between the retracted position and the fully deployed position, i.e., at any position between the retracted position and the fully deployed position, or in either the fully deployed position or fully retracted position. Illustrated lock 54 consists of a threaded stud 56 having a knob 58 fixed at one end thereof, and having a surface (not shown) at the other end thereof that frictionally engages handle 12. High friction surfaces can be provided on either or both engaging surfaces of stud 56 and handle 12. Various alternative-locking arrangements may be utilized. However, an inherent advantage with the locking mechanism of the illustrated embodiment, is that it allows material-spreading implement 16 to be retained at any position between the fully deployed and retracted positions (i.e., allows infinite adjustment) through easy manipulation of knob 58.

As best shown in FIGS. 5A–5C, the substantially continuous plate 26 is bent or curved with respect to an axis that is approximately perpendicular to the longitudinal axis of the handle. The arcuate shape of plate 26 allows materials to be more easily spread uniformly. Other examples of curved or bent plates that may be used are shown in FIGS. 13A–19A and 13B–19B. The material-spreading implement 16' shown in FIGS. 17A and 17B is basically an inverted scoop design having side walls, and an opening facing rearwardly. Material-spreading implement 16' may be pivotally attached to a distal end of push rod 32 shown in FIGS. 1–5C in place of material-spreading implement 16. The scoop-shaped material-spreading implement 16' may be used by rotating handle 12 about its longitudinal axis 180 degrees and dragging the scoop-shaped material-spreading implement along the ground. This configuration causes material to be contained in the material-spreading implement 16' as it is moved along the ground.

In FIGS. 18A–18B, another scoop-shaped material-spreading implement 16" is shown. Material-spreading implement 16" includes side walls, an open bottom, and a guide plate 38' with tabs 39' instead of the apertures 39 described with respect to tool 10. Material-spreading implement 16" is designed to be used right-side-up, like material-spreading implement 16 of tool 10, and the other material-spreading implements shown in FIGS. 13A, 14A, 15A, 16A and 19A.

The ability to adjust the position of material-spreading implement 16 at any location between the retracted and fully deployed position is extremely beneficial because it allows the spreading implement to be optimized for spreading various types of materials. In general, fine materials are more easily spread when the material-spreading implement is at or near the fully deployed position, whereas coarser materials are more easily spread when material-spreading implement 16 is located at a position intermediate between the retracted and fully deployed positions. Also, the position of the material-spreading implement can be adjusted between the retracted and fully deployed positions to change the effective or exposed length of the tines. This allows optimization of the tine length for the particular raking conditions.

The combination rake and material-spreading tool of this invention is useful for spreading any of a variety of different materials, including sand, wood chips, bark, ornamental stone, top soil, peat moss and the like. Further, the combination rake and material-spreading tool of this invention may be easily converted for use as a conventional rake.

The materials that may be used for fabricating the combination rake and material-spreading tool of this invention are those generally used for conventional gardening, cultivating and landscaping tools. For example, handle 12 may be fabricated from wood, thermoplastic materials, fiber reinforced thermoset materials, metal such as aluminum, etc. Suitable materials for plate 26 include metals, thermoplastic materials, and fiber-reinforced thermoset materials. The components of raking implement 14 may be made of a metal such as steel or a durable plastic. Push rod 32 and axle 34 may be made of a metal such as steel or aluminum, fiber reinforced thermoset material, etc.

The invention also encompasses a kit for converting a rake into a combination rake and material-spreading tool of the type generally described above. The kit may include a material-spreading implement configured for attachment to a rake and which includes a substantially continuous plate that (when the material-spreading implement is attached to a rake) is moveable between a retracted position in which the material-spreading implement exposes the rake tines for normal raking operations and a fully deployed position in which the material-spreading implement is positioned with a lower edge of the substantially continuous plate positioned proximate distal free ends 28 of tines 24 of raking implement 14. The kit may also include an actuator, locking mechanism, push rod, a spring and guides for the push rod, as described above.

A second embodiment of the invention is shown in FIGS. 6–12. Tool 110 includes a handle 112, and a rake head 118. A material-moving implement or plate 126 (which may be made of flexible plastic) is guided between a retracted position and a deployed position by guide channels 139 (FIG. 9) mounted on rake head 118 and engaging opposite edges 140 (FIG. 12) of plate 126. An advantage with this embodiment is that tines 124 are completely free for full utilization. As shown in FIG. 9, handle 112 is a hollow shaft through which a push tube 180 extends. Push tube 180 has an outer diameter that is only slightly less than the inner diameter of handle shaft 112, whereby push tube 180 can be moved axially through, and guided by handle shaft 112. A bracket 182 is fixed on the distal end of handle shaft 112. Rake head 118 is supported by lateral support arms 183 and 184 (FIG. 8), which are fixed to bracket 182. Fixed to the distal end of push tube 180 is an end cap bracket 185 (FIG. 9). A linkage 186 is pivotally connected to end cap bracket 185 at pivot point 187, and is also pivotally connected to plate 126 at pivot axis 188. More specifically, linkage 186 is a T-shaped component having axles 189 and 190 journaled in tubular members 191 and 192 which are fixed to plate 126.

A proximal end cap 193 is fixed to the proximal end of push tube 180 (see FIG. 10). A compression spring 194 is located in an annular space defined between walls 195 and 196 of proximal end cap 193 and the outer surface of push tube 180. The distal end of compression spring 194 abuts the proximal end of handle shaft 112. Spring 194 urges end cap 193 and push tube 180 in the proximal direction relative to handle shaft 112, which in turn causes end cap bracket 185 and linkage 186 to be urged in the proximal direction. As a result, plate 126 is also urged in a generally proximal direction to a retracted position. In a fully retracted position bracket 182 serves as a stop against which end cap 185 abuts. To move plate 126 to a deployed position, proximal end cap 193 is urged in a distal direction relative to handle shaft 112. This can be accomplished by grasping handle shaft 112 in one hand, grasping proximal end cap 193 in the other hand, and urging proximal end cap 193 toward the rake head 118. This causes proximal end cap 193 to slide along handle shaft 112 in the distal direction, which in turn causes push tube 180, linkage 186 and plate 126 to move distally into a deployed position. A lock 197 (FIG. 11) is provided for retaining the material-spreading implement 126 in a selected deployed position. Lock 197 includes a threaded stud 198 and a knob 199 fixed to stud 198. Stud 198 is threaded through bracket 182 and handle shaft 112, and includes a surface 200 capable of frictionally engaging an outer surface of push tube 180 to lock the position of push tube 180 relative to handle shaft 112.

Figure 20:
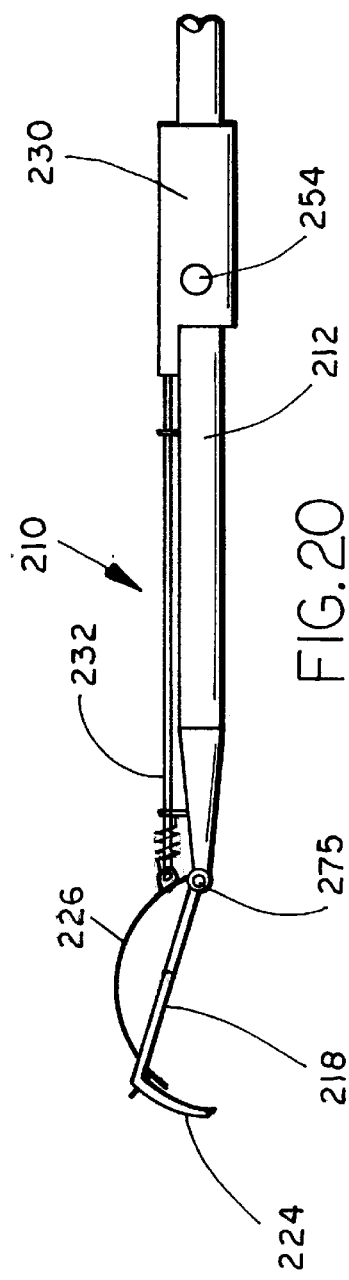
FIG. 20 is a side view of a combination rake and material-spreading tool in accordance with a third embodiment of the invention.

FIG. 20 shows a third embodiment 210 of the invention. Tool 210 is similar to tool 10 shown in FIGS. 1–5C. However, tool 210 includes a rake head 218 that is pivotally connected to handle shaft 212 at pivot axis 275, whereby the angle of tines 224 can be adjusted as desired to accommodate various raking conditions, such as raking uphill or downhill. Rake 210 includes a push rod 232, a material-moving implement or plate 226, an actuator 230, a lock mechanism 254, and other features similar to tool 10 of FIGS. 1–5C. However, in the embodiment shown in FIG. 20, the proximal end of plate 226 is attached either to rake head 218 or the distal end of handle 212 at a point near pivot axis 275.

Figure 21:
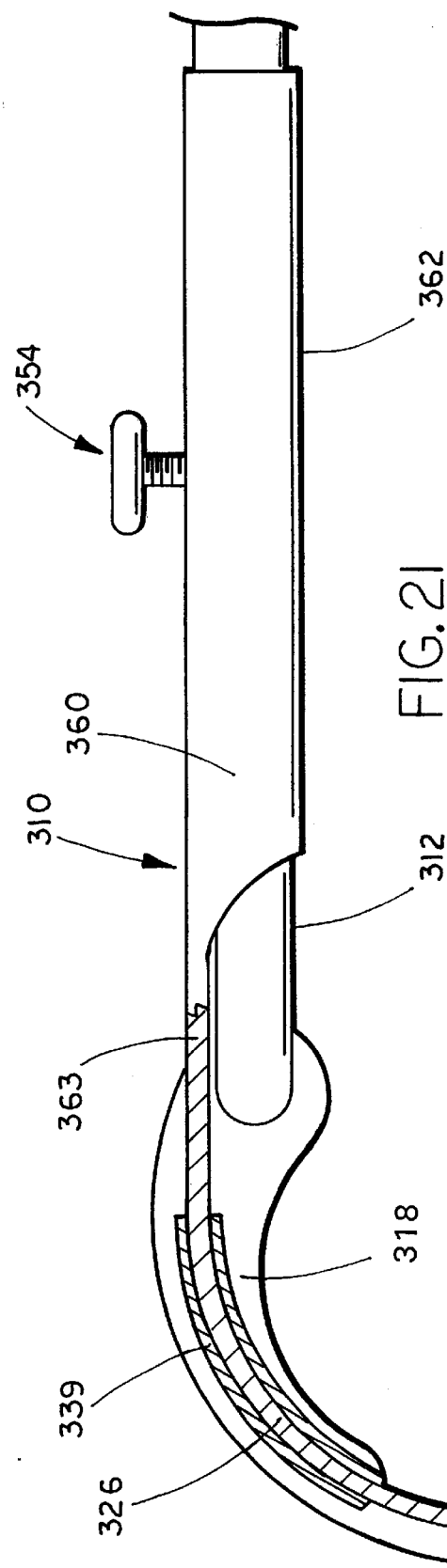
FIG. 21 is a partial cross-sectional view and partial side view of a combination rake and material-spreading tool in accordance with a fourth embodiment of the invention.

FIG. 21 shows a fourth embodiment 310 of the invention. Tool 310 is generally similar to tool 110 (shown in FIGS. 6–12). However, tool 310 includes an integrated, one-piece actuator/linkage/material-spreading implement assembly 360. Component 360 includes a generally tubular shaped section 362 that slides along handle shaft 312, an integral linkage section 363, and an integral plate section 326. Rake head 318 can be connected to handle shaft 312 either rigidly or pivotally. Rake head 318 includes guides 339 generally similar to guides 139 of tool 110 (described above). Plate 326 is moved between a deployed position and a retracted position by sliding section 362 along handle shaft 312. A lock 354 that is generally similar to lock 54 of the first embodiment 10, is provided to lock plate 326 at a desired retracted or deployed position.

Figure 22:
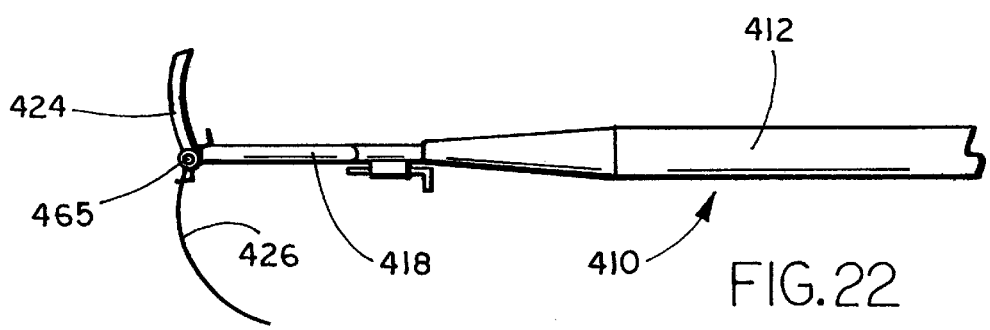
FIG. 22 is a side view of a combination rake and material-spreading tool in accordance with a fifth embodiment of the invention, with the material-spreading implement in a deployed position.
Figure 23:
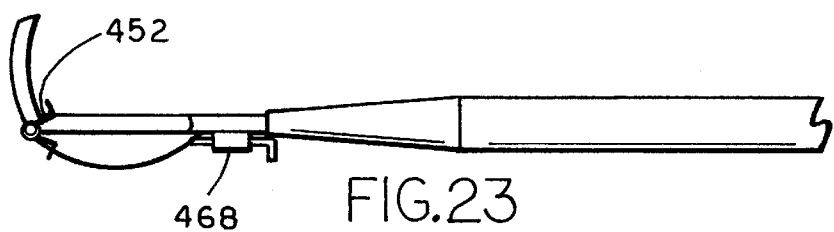
FIG. 23 is a side view of the tool shown in FIG. 22, with the material-spreading implement in the retracted position.

A fifth embodiment 410 of the invention is shown in FIGS. 22 and 23. Tool 410 includes a handle shaft 412 and a rake head 418. A material-spreading implement 426 is pivotally connected to rake head 418 at pivot axis 465. Material-spreading implement 426 can extend in a direction opposite from the direction from which tines 424 extend (as shown in FIG. 22), or can be rotated into a retracted position as shown in FIG. 23. A locking mechanism 468 is used to hold material-spreading implement 426 in a fully retracted or stored position when it is not needed. A spring 452 urges material-spreading implement 426 into a fully deployed position as shown in FIG. 22.

An additional feature that may be incorporated into the tools of this invention is an adjustable neck that allows the rake head and material-spreading implement carried thereon to be rotated with respect to the handle to adjust the angle of the rake or material-spreading implement for a particular application or for a particular user. Examples of adjustable necks for rakes and other tools have been known for many years.

Although the invention has been described with respect to an actuator and push rod arrangement in which deployment and retraction of the material-spreading implement is achieved by pushing or pulling on the actuator which in turn pushes or pulls on the push rod, it is conceivable that alternative mechanisms including screws, worm gears, etc. may be used for moving the material-spreading implement between the retracted and deployed position without departing from the spirit or scope of the invention. Further, although the illustrated embodiments are operated manually, it is possible to use an electric motor to drive a linkage (such as a worm screw) that moves the material-spreading implement between the retracted and deployed positions.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A combination rake and material-spreading implement, comprising:
   an elongate shaft;
   a rake head including a plurality of rigid tines, the rake head fixed at one end of the elongate shaft;
   a material-spreading implement including a substantially continuous plate, the material-spreading implement pivotally attached to the tool for rotational movement with respect to the rake head between a fully retracted position and a fully deployed position; and
   a lock for retaining the material-spreading implement at a position between the fully deployed position and the fully retracted position to adjust the effective length of the tines.

2. The tool of claim 1, wherein the plate completely superposes the tines when the material-spreading implement is in the fully deployed position.

3. The tool of claim 1, wherein the material-spreading implement is urged into the retracted position by a biasing means.

4. The tool of claim 1, further comprising a spring that urges the material-spreading implement into the retracted position.

5. The tool of claim 1, further comprising an actuator located on the elongate shaft, and a linkage operably linking the actuator to the material-spreading implement, whereby movement of the material-spreading implement between the retracted position and the deployed position may be achieved by manipulation of the actuator.

6. The tool of claim 5, wherein the elongate shaft includes a hollow section and the linkage is a push rod that extends through and is guided by the hollow section of the elongate shaft.

7. The tool of claim 5, wherein the linkage is a rod located adjacent to the elongate shaft and is guided during movement by at least one guide attached to the elongate shaft.

8. The tool of claim 7, wherein the material-spreading implement is pivotably connected to the rod and includes a guide plate with a plurality of apertures through which the tines project to guide the material-spreading implement during movement between the retracted position and the deployed position.

9. The tool of claim 1, wherein the plate is rotatable an axis that is approximately perpendicular to the longitudinal axis of the elongate shaft.

* * * * *

UNITED STATES PATENT AND TRADEMARK OFFICE
CERTIFICATE OF CORRECTION

PATENT NO. : 6,722,115 B2
DATED : April 20, 2004
INVENTOR(S) : David S. DeWinter It is certified that error appears in the above-identified patent and that said Letters Patent is hereby corrected as shown below:

Column 2,
Line 7, after "Fig." insert -- 1 --.

Column 8,
Line 30, after "rotatable" insert -- about --.

Signed and Sealed this

Twenty-seventh Day of July, 2004

JON W. DUDAS
*Acting Director of the United States Patent and Trademark Office*